United States Patent
Gonzalez et al.

(10) Patent No.: US 8,538,973 B1
(45) Date of Patent: Sep. 17, 2013

(54) DIRECTIONS-BASED RANKING OF PLACES RETURNED BY LOCAL SEARCH QUERIES

(75) Inventors: Hector Gonzalez, Sunnyvale, CA (US); Petros Venetis, Athens (GR); Christian S. Jensen, Gistrup (DE); Alon Y. Halevy, Los Altos, CA (US)

(73) Assignee: Google Inc., Mountain View, CA (US)

( * ) Notice: Subject to any disclaimer, the term of this patent is extended or adjusted under 35 U.S.C. 154(b) by 251 days.

(21) Appl. No.: 12/794,636

(22) Filed: Jun. 4, 2010

Related U.S. Application Data

(60) Provisional application No. 61/321,073, filed on Apr. 5, 2010.

(51) Int. Cl.
*G06F 17/30* (2006.01)
*G06F 7/00* (2006.01)

(52) U.S. Cl.
USPC ......................................................... 707/758

(58) Field of Classification Search
USPC ......................................................... 707/758
See application file for complete search history.

(56) References Cited

U.S. PATENT DOCUMENTS 7,082,365 B2 * 7/2006 Sheha et al. .................. 701/426

OTHER PUBLICATIONS

Rimma V. Nehme: "Continuous Query Processing on Spatio-Temporal Data Streams", A Thesis Submitted to the Faculty of the Worcester Polytechnic Institute in partial fulfillment of the requirements for the Degree of Master of Science in Computer Science by Jun. 2005.*

Hui Ding et al.: Efficient Maintenance of Continuous Queries for Trajectories Received: Oct. 23, 2006 / Revised: Mar. 10, 2007 Accepted: Apr. 3, 2007 © Springer Science + Business Media, LLC 2007.*

* cited by examiner

*Primary Examiner* — Kuen Lu
(74) *Attorney, Agent, or Firm* — Morgan, Lewis & Bockius LLP

(57) ABSTRACT

A system and a method for ranking search results of local search queries. A local search query and a current location of a user are received. Next, two or more places that satisfy the local search query are identified, and for each respective place a corresponding distance from the current location of the user to the respective place is also identified. The two or more places are then ranked in accordance with scores that are based, at least in part, on popularity of the two or more places and the corresponding distances from the current location of the user, to produce a set of ranked places. The ranked set of places is then provided to the user.

31 Claims, 10 Drawing Sheets

| ID 501 | Day of Week 502 | Time 503 | Distance Traveled 504 | Count 505 |
|---|---|---|---|---|
| 1 | Monday | 6AM-10AM | < 1 mile | 10 |
| 1 | Monday | 10AM-2PM | < 1 mile | 500 |
| 1 | Monday | 2PM-6PM | < 1 mile | 100 |
| 1 | Monday | 6PM-10PM | < 1 mile | 250 |
| 1 | Monday | 6AM-10AM | 2 miles | 20 |
| 1 | Monday | 6AM-10AM | > 2 miles | 5 |
| 1 | Tuesday | 6AM-10AM | < 1 mile | 11 |
| 2 | Monday | 6AM-10AM | < 1 mile | 350 |

Figure 5

DIRECTIONS-BASED RANKING OF PLACES RETURNED BY LOCAL SEARCH QUERIES

RELATED APPLICATIONS

This application claims priority to U.S. Provisional Patent Application Ser. No. 61/321,073, filed Apr. 5, 2010, which is incorporated herein by reference in its entirety.

TECHNICAL FIELD

The disclosed embodiments relate generally to a system and method for ranking search results of local search queries.

BACKGROUND

Internet-enabled mobile devices (e.g., laptop computers, mobile phones, personal navigation devices, etc.) allow users to perform web searches anywhere that a data connection is available. Users of these devices are therefore able to perform local search queries to locate places such as businesses and other points-of-interest. For example, a user may use an Internet-enabled mobile device to submit a local search query "Italian restaurant in San Francisco" to a search engine to locate an Italian restaurant in San Francisco. Unfortunately, the search results returned by the search engine, although relevant to the search terms in the local search query, may be ranked in a manner that is not desirable to the user. For example, the top search result may be an Italian restaurant that is on one side of San Francisco, whereas the user is on the other side of San Francisco. If the user's mode of transportation is by foot, the top search result may not be practical. Furthermore, search results are typically ranked based on the number of other relevant web pages that link to the web pages corresponding to the search results (e.g., an importance metric). Search results presently do not account for the popularity of places (as opposed to graphical tree position and linkage). Thus, it is highly desirable to provide a system and method for ranking search results of local search queries without the aforementioned problems.

SUMMARY

Some embodiments provide a system, a computer readable storage medium including instructions, and a computer-implemented method for ranking search results of local search queries. A local search query and a current location of a user are received. Next, two or more places that satisfy the local search query are identified, and for each respective place a corresponding distance from the current location of the user to the respective place is also identified. The two or more places are then ranked in accordance with scores that are based, at least in part, on popularity of the two or more places and the corresponding distances from the current location of the user, to produce a set of ranked places. The ranked set of places is then provided to the user.

In some embodiments, the popularity of a respective place comprises a historical popularity of the respective place in directions queries.

In some embodiments, the popularity of a respective place comprises a historical popularity of the respective place in directions queries received during a time frame corresponding to a time at which the search query is received.

In some embodiments, in the popularity of a respective place is based on the historical popularity of the respective place in directions queries received during a time frame corresponding to a time at which the search query is received and at least one additional factor selected from the group consisting of user ratings of the place, user reviews of the place, and a query independent page rank of a web page associated with the place.

In some embodiments, prior to ranking the two or more places in accordance with scores to produce the set of ranked places, the popularity of a respective place is determined based on historical records of directions queries.

In some embodiments, the popularity of the respective place is determined based on historical records of directions queries as follows. A respective location corresponding to the respective place is determined. The historical records of the directions queries are then searched to determine the number of directions queries in which the destination was the respective location. Next, the number of directions queries is stored in at least one record of a popularity database. The at least one record of the popularity database is then associated with the respective place.

In some embodiments, the respective location is a set of coordinates.

In some embodiments, the set of coordinates is selected from the group consisting of latitude and longitude coordinates and global satellite navigation coordinates.

In some embodiments, prior to storing the number of directions queries in at least one record of the popularity database, the following operations are performed. The directions queries for any particular destination are grouped into bins based on a time of day that the directions queries were made, the day of the week that the directions queries were made, and a distance users traveled to the respective location. The number of directions queries corresponding to each bin is then determined.

In some embodiments, the number of directions queries is stored in at least one record of the popularity database by storing the number of directions queries for each bin in respective records of the popularity database.

In some embodiments, the two or more places are ranked in accordance with scores that are based, at least in part, on the popularity of the two or more places and the current location of the user, to produce the set of ranked places as follows. The popularity database is queried to determine the popularity of the two or more places. Next, scores for each place are computed based, at least in part, on the popularity of the place, the current location of the user, distances users traveled to the two or more places, and a maximum distance that the user is willing to travel. The two or more places are then ranked based on the scores to produce the set of ranked places.

In some embodiments, the popularity database is queried to determine the popularity of a respective place as follows. A respective record of the popularity database for a respective bin of the respective place that corresponds to the time at which the local search query was received, and a day of the week on which the local search query was received is identified. The popularity of the respective place is then determined from the respective record.

In some embodiments, the scores are also computed based on factors selected from the group consisting of reviews of the two or more places, search engine rankings for web pages associated with the two or more places, and a mode of travel.

In some embodiments, the popularity of the respective place is periodically determined based on the historical records of directions queries. The at least one record of the popularity database is then periodically updated.

In some embodiments, the historical records of directions queries are selected from the group consisting of driving directions queries and mobile location-based queries.

In some embodiments, the two or more places that satisfy the local search query are identified by identifying the two or more places that satisfy the local search query and that are within a predetermined distance from the current location of the user.

In some embodiments, the predetermined distance is selected from the group consisting of a maximum distance that that user is willing to travel and a maximum distance that other users were willing to travel to the two or more places.

In some embodiments, a respective place is selected from the group consisting of a business, a landmark, a park, and a point-of-interest.

In some embodiments, the current location of the user is obtained from a mobile electronic device of the user using a positioning system selected from the group consisting of a global satellite positioning system, a cellular tower positioning system, a Wi-Fi positioning system, and an Internet Protocol positioning system.

BRIEF DESCRIPTION OF THE DRAWINGS

FIG. 5 illustrates an exemplary set of popularity records, according to some embodiments.

Like reference numerals refer to corresponding parts throughout the drawings.

DESCRIPTION OF EMBODIMENTS

To address the aforementioned deficiencies of ranking a set of places returned in response to a local search query, some embodiments rank the local search results based at least in part on the popularity of the places. In some embodiments, the popularity of the places is determined from directions query logs. The directions query logs are logs of directions queries performed by users requesting directions from a starting address (or current location) to a destination address. In some embodiments, a place (e.g., a business, etc.) is matched to the destination address of a directions query and the corresponding place receives a "vote". The more users who search for the destination address in directions queries, the more votes the corresponding place receives and the more popular the corresponding place is deemed. Thus, the set of places may be ranked based on the popularity of the places determined in this manner. In some embodiments, the popularity of the places is determined at least in part from mobile location-based search logs. The mobile location-based search logs are logs of local searches (e.g., a search for an "Italian restaurant" near the current location of a user) performed from mobile devices. Note that the mobile device typically includes a positioning system such as a global satellite positioning system (e.g., GPS) or a cellular tower positioning system. A vote for a particular place may be registered when the user of the mobile device selects a particular result (e.g., requests directions to the restaurant, requests a reservation, etc.). The embodiments discussed above are described in more detail below.

Figure 1:
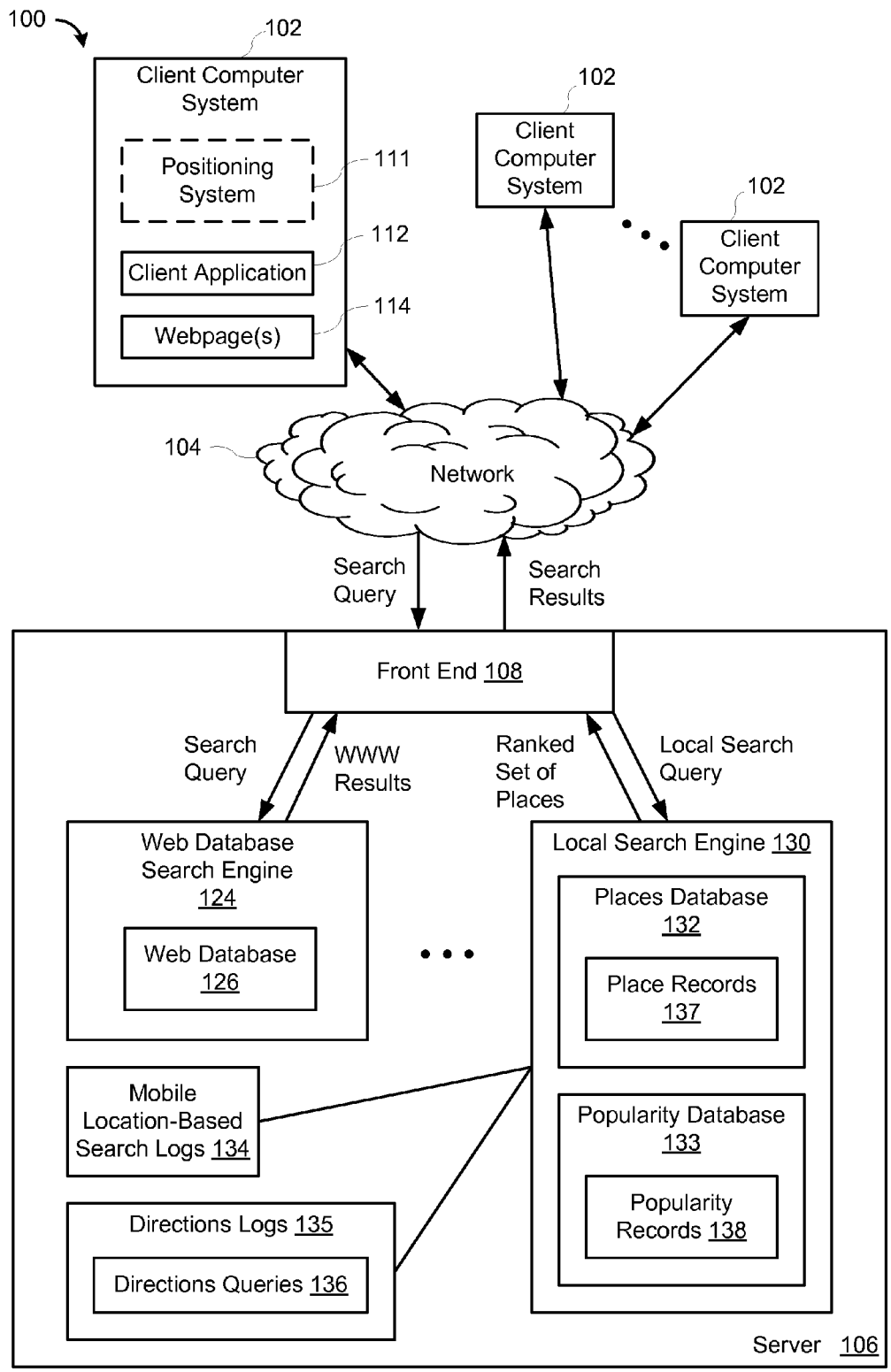
FIG. 1 is a block diagram of a client-server system, according to some embodiments.

FIG. 1 is a block diagram 100 of a client-server system. One or more client computer systems 102 and a server 106 are coupled to a network 104.

In some embodiments, server 106 includes front end 108, a web database search engine 124, for locating documents on the world wide web that match submitted queries, and a local search engine 130 for identifying places or locations that match submitted queries and that are "local" with respect to a specified location. The specified location is typically the current location of the user who has submitted the query, but alternatively may be a location specified by the user (e.g., a location that the user plans to visit). Note that server 106 may include other types of search engines such as a map search engine that perform location-based searches and/or driving direction searches, a news search engine that performs searches for news content, a reviews search engine that searches for reviews, a product search engine that searches for products, and the like. Web database search engine 124 is sometimes herein referred to as a primary search engine and local search engine 130 is sometimes herein referred to as a secondary search engine.

In some embodiments, front end 108 facilitates communication between server 106 and network 104. Front end 108 allows for the transfer of information from server 106 to network 104 to be displayed by a client application 112 executed by a client computer system 102. Web database search engine 124 (also called an Internet search engine) receives search queries and sends results to the front end 108. In some embodiments, web database search engine 124 includes a web database 126 (also sometimes herein called a primary database), which stores information associated with information available on the World Wide Web. Local search engine 130 receives search queries from and sends a ranked set of places (e.g., local search results, also sometimes called location search results) to front end 108. In some embodiments, local search engine 130 includes a places database 132 that stores information relating to places in place records 137 and a popularity database 133 that stores information relating to the popularity of places in places database 132 in popularity records 138. Places database 132 and popularity database 133 are sometimes herein referred to as secondary databases. In some embodiments, places database 132 may be located on a computer system separate and distinct from server 106. In some embodiments, popularity database 133 may be located on a computer system separate and distinct from server 106.

In some embodiments, the local search engine 130 serves as an online application that services client requests (which may be called local search queries) for information about places. As discussed below, local search engine 130 may store address information or any additional information about "places" or "locations," which may include stores, businesses, other organizations (e.g., governmental and non-governmental organizations, departments, and so on), parks, buildings, geographic features, and the like.

In some embodiments, server 106 includes mobile location-based search logs 134 and/or direction logs 135 that are used by local search engine 130 to populate popularity database 133. In some embodiments, mobile location-based search logs 134 are produced by a mobile location-based search engine that responds to location-based search queries received from mobile devices (e.g., mobile phones, etc.). In some embodiments, direction logs 135 are produced by a directions search engine that responds to directions queries 136 (e.g., searches for driving directions, searches for walking directions, etc.).

In some embodiments, the client computer systems 102 may be any of a number of devices (e.g. a computer, an internet kiosk, a personal digital assistant, a mobile phone, a smart phone, a tablet computer, a desktop computer system, a laptop computer system, a workstation, a personal navigation device, etc.) and includes a client application 112 that permits a user to view web pages 114 or other documents or information. Client application 112 may be a software application that permits a user to interact with the client computer system 102 and/or network resources to perform one or more tasks. For example, client application 112 may be a web browser (e.g., Firefox, Internet Explorer, Safari, etc.) or other type of application that permits a user to search for, browse, and/or use resources, such as one or more web pages 114, on a respective client computer system 102 and/or accessible via network 104. Optionally, a respective client computer system 102 includes a positioning system 111. In some embodiments, the positioning system 111 includes one or more of a global satellite positioning system receiver that determines the current location of the client computer system using a network of satellites, a cellular tower positioning system receiver that determines the current location of the client computer system using a network of cellular towers, a Wi-Fi positioning system receiver that determines the current location of the client computer system using a network of Wi-Fi access points, and an IP-based positioning system that determines the current location of the client computer system from a location associated with an Internet Protocol address assigned to the client computer system.

Network 104 may be a local area network (LAN), a metropolitan area network, a wide area network (WAN), such as an intranet, an extranet, or the Internet, or any combination of such networks. It is sufficient that network 104 provides communication capability between client computer systems 102 and server 106. In some embodiments, network 104 uses HyperText Transport Protocol (HTTP) and/or Transmission Control Protocol/Internet Protocol (TCP/IP) to transport information between devices, such as clients computer systems 102 and server 106. The HTTP permits client computer systems to access various resources available via network 104. The various embodiments of the invention, however, are not limited to the use of any particular protocol. The term "resource" as used throughout this specification refers to any document, object, information item, set of information, or service that is accessible via a Uniform Resource Locator (URL) and can be, for example, a web page, a text or word processing document, an email message, a transcribed voice message, a database, an image, or a computational object.

Figure 2:
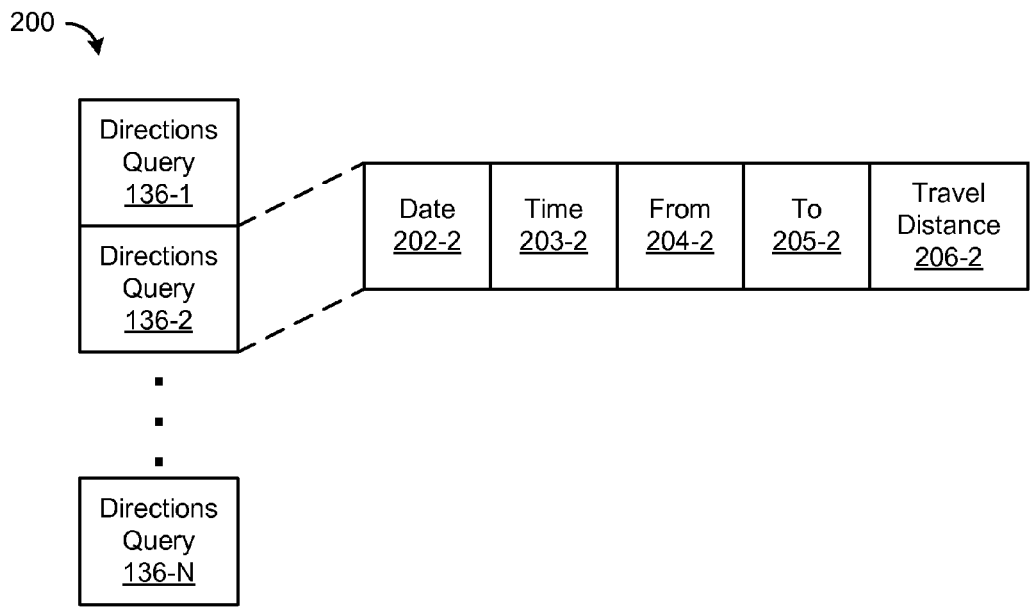
FIG. 2 is a block diagram illustrating an exemplary data structure for storing information relating to direction queries, according to some embodiments.
Figure 3:
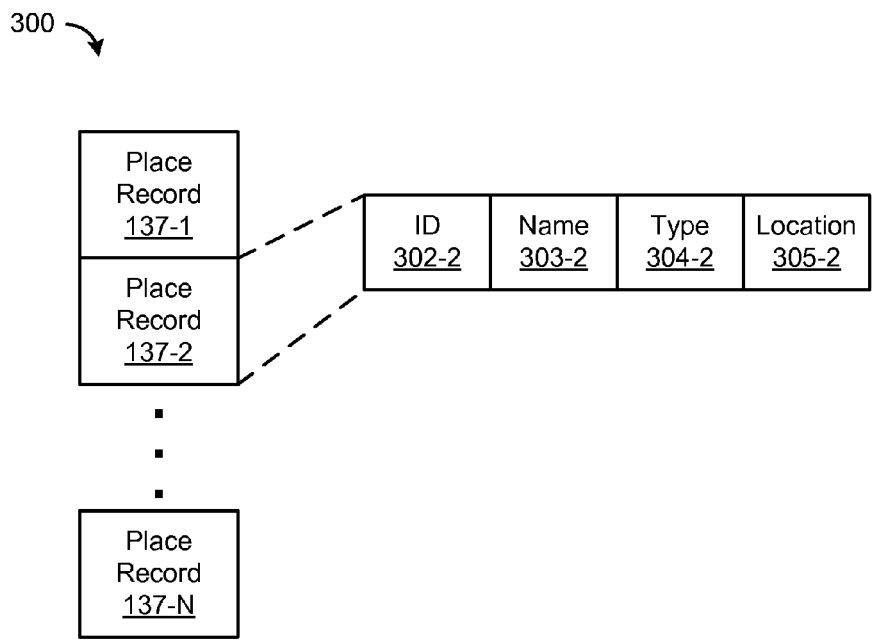
FIG. 3 is a block diagram illustrating an exemplary data structure for storing information relating to places, according to some embodiments.

As discussed above, analysis of historical directions queries 136 may be used to determine the popularity of places. Historical (i.e., previously submitted) directions queries may be obtained from the directions logs 135 produced by a directions search engine. FIG. 2 is a block diagram 200 illustrating an exemplary data structure (e.g., a file, or set of files) for storing information relating to direction queries 136, according to some embodiments. A respective direction query 136-2 includes a date field 202-2 and a time field 203-2 whose values indicate the date and time, respectively, at which the direction query 136-2 was received. Alternatively, the date and time fields may be replaced by a timestamp field for storing a timestamp indicative of the date and time at which direct query 136-2 was received or processed. The direction query 136-2 also includes a from field 204-2 whose value indicates the starting point of the directions and a to field 205-2 whose value indicates the ending point of the directions. Optionally, a respective direction query 136-2 also includes a travel distance field 206-2, indicating the travel distance between the starting point and ending point of the direction query. In some embodiments, the from field 204-2 and/or the to field 205-2 include values that are addresses or portions of addresses. In some embodiments, the from field 204-2 and/or the to field 205-2 include values that are coordinates (e.g., GPS coordinates, latitude/longitude coordinates, etc.). In some embodiments, the directions queries 136 are extracted from the directions logs 135 and inserted into the data structure illustrated in FIG. 2. Alternatively, the to field 205-2 and/or the from field 204-2 includes a respective place identifier that matches the identifier 302 of a place record 137 (FIG. 3).

The from field 204-2 and/or the to field 205-2 may include coordinates (e.g., satellite navigation coordinates or latitude/longitude coordinates) that are obtained from information included in the directions queries 136. The coordinates of the "from" location and/or the "to" location for a particular direction query may have varying levels of precision. For example, if the full street address for the "from" location (or the "to" location) is known for the particular direction query, a reverse geo-coding operation may be performed on the street address for the "from" location (or the "to" location) to obtain a coordinate corresponding to the street address. If, however, only a partial address is available for the "from" location (or the "to" location), the from field 204-2 (or the to field 205-2) is assigned to bounded area at a level of specificity corresponding to the specificity of the partial address. For example, if the partial address only includes a city, the from field 204-2 (or the to field 205-2) is assigned to a bounded area corresponding to the area of the city. Similarly, if the partial address includes the street name and city, the from field 204-2 (or the to field 205-2) is assigned to a bounded area corresponding to the area including the street of the city.

In some embodiments, the directions queries 136 are stored by the directions search engine in directions logs 135 using the data structure illustrated in FIG. 2. It is noted that the data structure 200 for storing historical directions queries may store additional information and thus have additional fields, and that the data structure may be organized differently than shown in FIG. 2.

In embodiments that use mobile location-based search logs 134 to generate popularity data, a data structure similar to the one shown in FIG. 2 may be used to record each search result selected by a user after submitting a local search query from a mobile device. In this case, the "from" field 204, if provided, would correspond to the location of the mobile device at the time the query is submitted, or alternatively the location of the mobile device at the time at which the user selects the search result corresponding to the "to" field 205. The travel time field 206, if provided, would correspond to a travel distance from the mobile device location to the location of the user-selected search result.

In some embodiments, the places database 132 includes place records 137 that are obtained from a plurality of databases. For example, the place records 137 may be obtained from a business directory (e.g., electronic directories). Alternatively, or additionally, the place records may be obtained from information extracted from web pages on the Internet. For example, information about a restaurant may be extracted from a web page for the restaurant. FIG. 3 is a block diagram illustrating an exemplary data structure 300 for storing information relating to places into place records 137, according to some embodiments. A respective place record 137-2 includes an identifier field 302-2 whose value uniquely identifies the place record 137-2, a name field 303-2 whose value is a name of the place, a type field 304-2 whose value is a type of place (e.g., a business, a residence, a park, a monument, etc.), and a location field 305-2 whose value is a location of the place (e.g., specified by an address, satellite navigation coordinates, etc.). For places that are obtained from a business directory, the location field 305-2 may include coordinates (e.g., satellite navigation coordinates or latitude/longitude coordinates) that are obtained from the business directory. The coordinates of the places may have varying levels of precision. For example, if the full street address of a respective place is known, a reverse geo-coding operation may be performed on the street address to obtain a coordinate corresponding to the street address. If, however, only a partial address is available, the place is assigned to bounded area at a level of specificity corresponding to the specificity of the partial address. For example, if the partial address only includes a city, the place is assigned to a bounded area corresponding to the area of the city. Similarly, if the partial address includes the street name and city, the place is assigned to a bounded area corresponding to the area including the street of the city. It is noted that the data structure 300 for storing place information may store additional information and thus have additional fields, and that the data structure may be organized differently than shown in FIG. 3.

As discussed above, some embodiments use the popularity of places to rank a set of local search results. In some embodiments, the popularity of a respective place is determined from the number of "votes" that the respective place receives. In some embodiments, the number of votes that the respective place receives is determined from the number of directions queries whose destination is the respective place. In embodiments that use mobile location-based search logs 134 to generate popularity data, the number of votes that a respective place receives is determined at least in part from the number of local search queries received from mobile devices in which the user-selected search result is the respective place. In some embodiments, a vote is assigned to a place if a direction query has a destination having a coordinate within a predetermined distance from the coordinate of the place. For example, the predetermined distance may be 100 feet. In some embodiments, for a place that does not have a full address, a vote is assigned to a place if a direction query has a destination having a coordinate that is within the bounded area corresponding to the place. In some embodiments, if the direction query includes a partial address for the destination, a vote is assigned to the place if the bounded area for the destination of direction query includes the coordinate (or intersects the bounded area) for the place.

Figure 4:
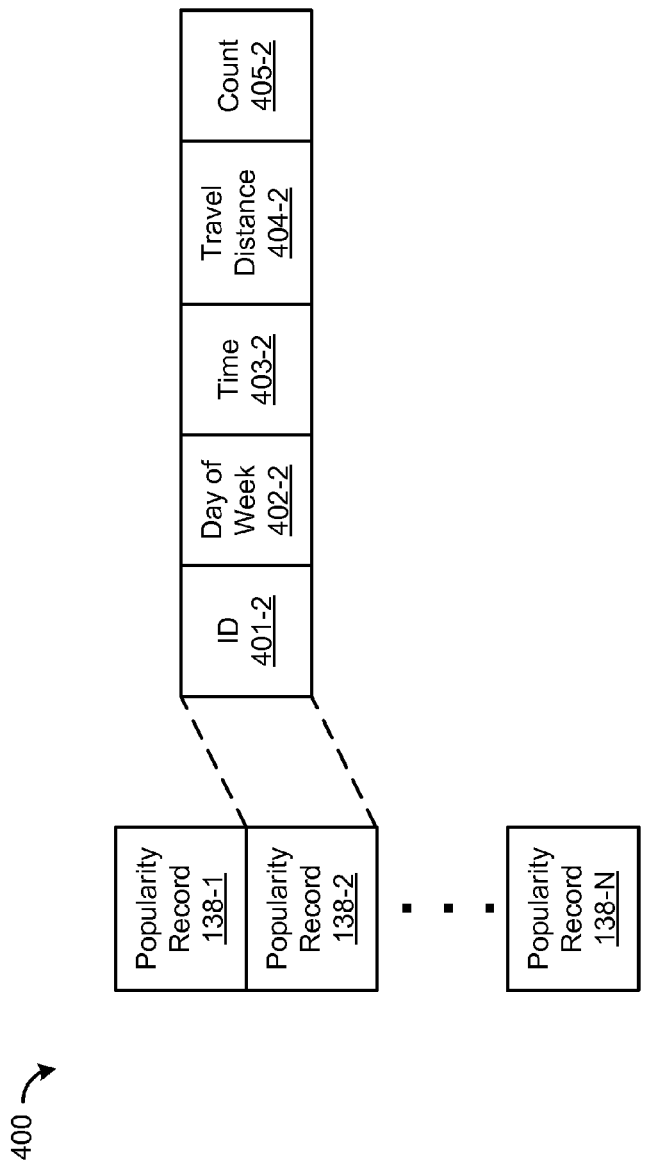
FIG. 4 is a block diagram illustrating an exemplary data structure for storing information relating to the popularity of places, according to some embodiments.

FIG. 4 is a block diagram 400 illustrating an exemplary data structure for storing information relating to the popularity of places into popularity records 138, according to some embodiments. A respective popularity record 138-2 includes an identifier field 401-2 whose value corresponds to a value in the identifier field 302 in the places database 132, a day of week field 402-2 whose value specifies a day of the week (or days of the week) to which the popularity record 138-2 applies, a time field 403-2 whose value specifies a time (or a time period) to which the popularity record 138-2 applies, a travel distance field 404-2 whose value indicates the distance (or a range of distances) that users have been willing to travel to the place whose identifier corresponds to the value in the identifier field 401-2, and a count field 405-2 whose value indicates the number of users who performed a query to the place whose identifier corresponds to the value in the identifier field 401-2 on the day of the week (or days of the week) specified in the day of week field 402-2 at the time (or time period) specified in the time field 403-2, and who were willing to travel the distance indicated in the travel distance field 404-2.

Note that the identifier field 401-2, the day of week field 402-2, the time field 403-2, and the travel distance field 404-2 define a "bin" into which the local search engine 130 places (or counts) directions queries. Using the identifier, the day of week, the time, and the travel distance to bin the directions queries allows an extra level of granularity for the ranking. For example, more users may perform directions queries for a breakfast restaurant in the morning hours (e.g., 6 AM to 12 PM) than in the evening hours. Similarly, more users may perform directions queries for a bar in the evening hours (e.g., 6 PM to 12 AM) than in the morning or afternoon hours. Furthermore, a place to which many users are willing to travel long distances may indicate that the place is more popular. For example, if the directions queries indicate that many users are willing to travel over five miles to reach a first particular restaurant, whereas only a handful of users are willing to travel even a mile to a second restaurant, the first restaurant may be ranked higher than the second restaurant because it is deemed to be more popular. Note that other ranking techniques based on these parameters (e.g., identifier, day of week, time, travel distance, and the number of users) may be used to rank or score a set of places in response to a local search query.

FIG. 5 illustrates a prophetic example of a set of popularity records 510 to 517. As discussed above, each popularity record has an identifier field 501, a day of week field 502, a time field 503, a distance traveled field 504, and a count field 505. Each popularity record corresponds to a bin defined by the aforementioned fields. For example, popularity records 510 to 516 are associated with a single place in the places database 132 whose identifier field has a value of 1 and popularity record 517 is associated with another place in the places database 132 whose identifier field has a value of 2. Each of these records are further binned into records for particular days of the week, particular time blocks, and a distance traveled (or to be traveled) by users that submitted the search queries. For example, popularity record 510 corresponds to directions queries (1) that have a destination corresponding to a place in the places database whose identifier field has a value of 1, (2) that were performed on a Monday between 6 AM and 10 AM, and (3) that were performed by users who traveled or would have to travel less than 1 mile to reach the destination. The local search engine 130 may use the information included in the popularity records to rank a set of search results. For example, popularity records 510 and 517 indicate that the place in the places database 132 having an identifier of "1" is less popular on Monday between 6 AM and 10 AM than the place in the places database 132 having an identifier of "2". Thus, if a local search query is performed during the hours of 6 AM and 10 AM and the set of places that match the search query includes both the place in the places database 132 having the identifier "1" and the place in the places database 132 having the identifier "2," the place having the identifier "2" is likely to be ranked higher in the search results than the place having the identifier "1". The second place is only "likely" to be ranked higher than the first place, because other factors, such as distance from the user's current location to these destinations and possibly other factors (e.g., user-specific factors, obtains from a user profile of the user submitting the search query) may have a significant impact on the ranking of these search results. For example, if the second place is much further from the user's current location than the first place, that would reduce the score of the second place relative to the first place. Furthermore, if the user profile indicates a strong preference for Italian restaurants over other types of restaurants, and if the first place is an Italian restaurant and the second place is not, that would also reduce the score of the second place relative to the first place.

Optionally, the accuracy of the user's current location affects the weighting of the distance to be traveled as a factor in the ranking of the places. For example, if the user's current location is determined using a global satellite navigation system, the user's current location may be known with high accuracy (e.g., within 50 feet of the user's current location). In these cases, the distance from the user's current location to each of the places in the search results is given higher weight in the ranking of the places. In contrast, if the user's current location is known with a low accuracy (e.g., the user's current location is known to be in a city), the distance from the user's current location to each of the places is given lower weight in the ranking of the places.

Note that the values listed in FIG. 5 are merely prophetic examples, not based on real data. Other values are possible. For example, the day of week can be a range of days (e.g., Monday-Friday, Saturday-Sunday, etc.), the time may be any particular time or time period, and the distance traveled may be any distance or range of distances.

Figure 6:
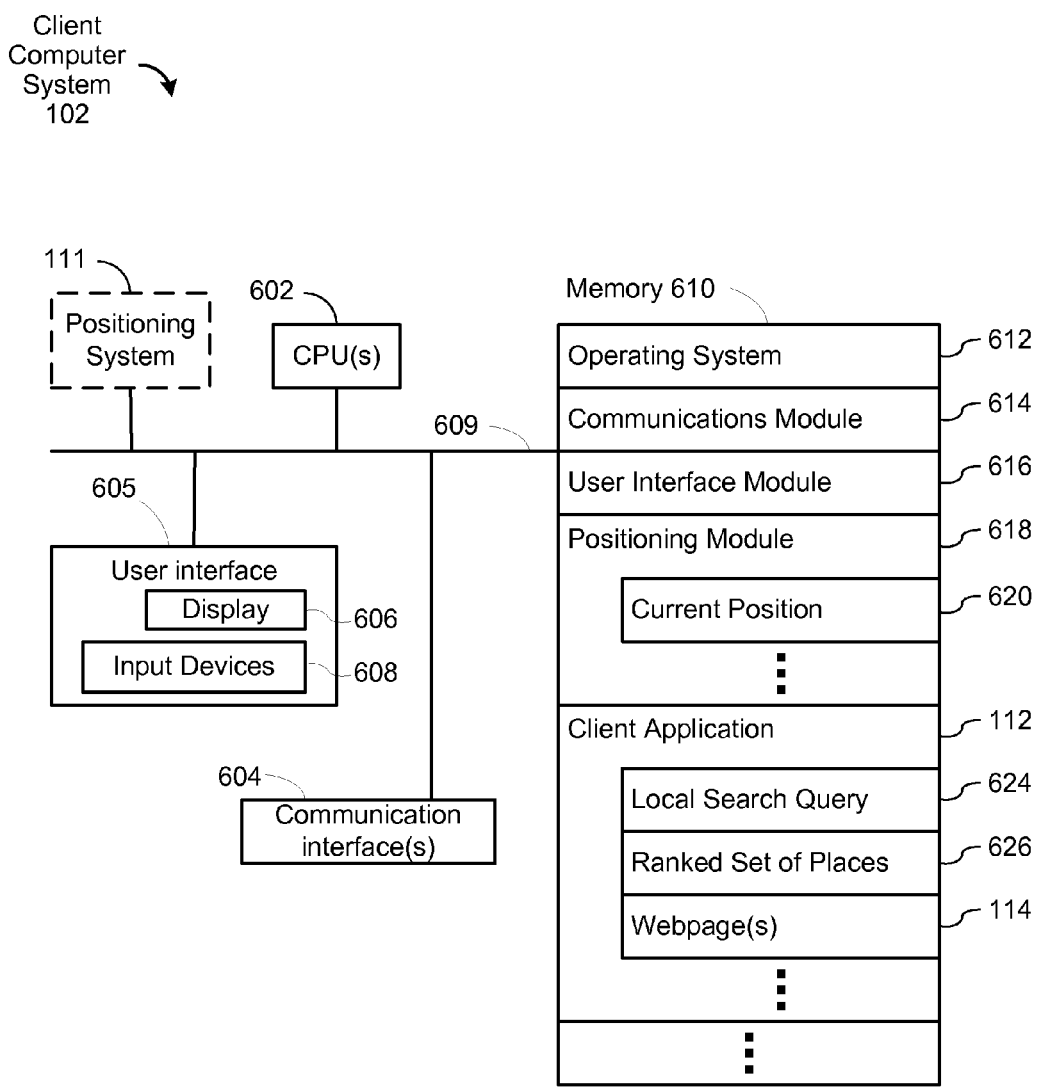
FIG. 6 is a block diagram of a client computer system, according to some embodiments.

FIG. 6 is a block diagram illustrating a client computer system 102, according to some embodiments. The client computer system 102 typically includes one or more processing units (CPU's) 602, one or more network or other communications interfaces 604, memory 610, and one or more communication buses 609 for interconnecting these components. The communication buses 609 may include circuitry (sometimes called a chipset) that interconnects and controls communications between system components. The client computer system 102 also includes a user interface 605 comprising a display device 606 and input devices 608 (e.g., keyboard, mouse, touch screen, keypads, etc.). As discussed above, in some embodiments client computer system 102 includes a positioning system 111 that determines the current position of the client computer system. Memory 610 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 610 may optionally include one or more storage devices remotely located from the CPU(s) 602. Memory 610, or alternately the non-volatile memory device(s) within memory 610, comprises a computer readable storage medium. In some embodiments, memory 610 or the computer readable storage medium of memory 610 stores the following programs, modules and data structures, or a subset thereof:

- operating system 612 that includes procedures for handling various basic system services and for performing hardware dependent tasks;
- communication module 614 that is used for connecting the client computer system 102 to other computers via the one or more communication interfaces 604 (wired or wireless) and one or more communication networks, such as the Internet, other wide area networks, local area networks, metropolitan area networks, and so on;
- user interface module 616 that receives commands from the user via the input devices 608 and generates user interface objects in display device 606;
- positioning module 618 that determines a current position 620 of the mobile device 600 based on data received from positioning system 111; and
- client application 112 (e.g., a web browser, a search application, etc.) that retrieves and displays web pages 114 in user interface 605, submits a local search query 624 to server 106, and receives and displays a ranked set of places 626 from server 106 in user interface 605.

Each of the above identified elements may be stored in one or more of the previously mentioned memory devices, and corresponds to a set of instructions for performing a function described above. The set of instructions can be executed by one or more processors (e.g., the CPUs 602). The above identified modules or programs (i.e., sets of instructions) need not be implemented as separate software programs, procedures or modules, and thus various subsets of these modules may be combined or otherwise re-arranged in various embodiments. In some embodiments, memory 610 may store a subset of the modules and data structures identified above. Furthermore, memory 610 may store additional modules and data structures not described above.

Although FIG. 6 shows a "client computer system," FIG. 6 is intended more as functional description of the various features which may be present in a client computer system than as a structural schematic of the embodiments described herein. In practice, and as recognized by those of ordinary skill in the art, items shown separately could be combined and some items could be separated.

Figure 7:
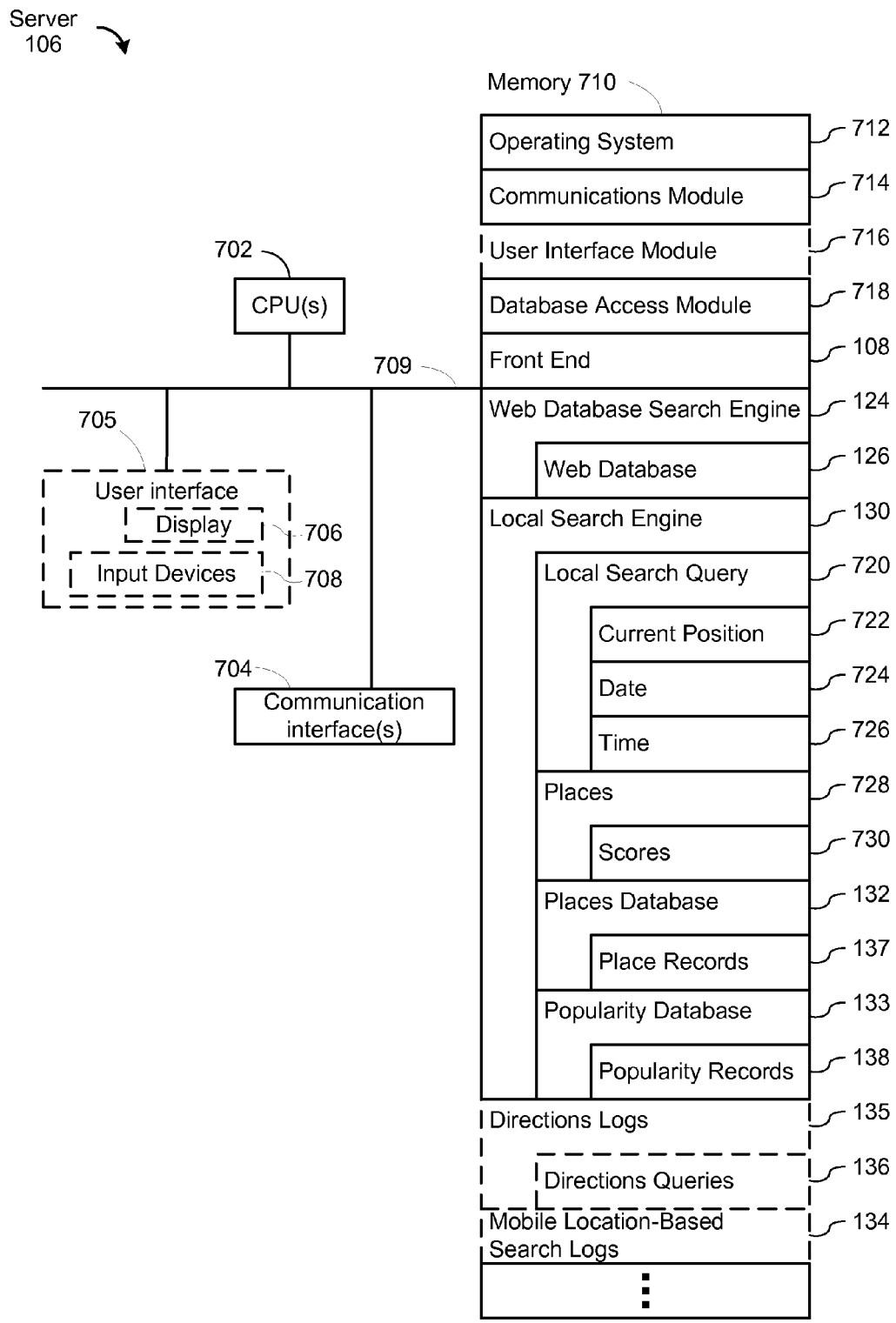
FIG. 7 is a block diagram of a server, according to some embodiments.

FIG. 7 is a block diagram illustrating server 106, according to some embodiments. Server 106 typically includes one or more processing units (CPU's) 702, one or more network or other communications interfaces 704, memory 710, and one or more communication buses 709 for interconnecting these components. The communication buses 709 may include circuitry (sometimes called a chipset) that interconnects and controls communications between system components. Server 106 may optionally include a user interface 705 comprising, for example, a display device 706 and input devices 708 (e.g., keyboard, mouse, touch screen, keypads, etc.). Memory 710 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 710 may optionally include one or more storage devices remotely located from the CPU(s) 702. Memory 710, or alternately the non-volatile memory device(s) within memory 710, comprises a computer readable storage medium. In some embodiments, memory 710 or the computer readable storage medium of memory 710 stores the following programs, modules and data structures, or a subset thereof:

- an operating system 712 that includes procedures for handling various basic system services and for performing hardware dependent tasks;
- a communication module 714 that is used for connecting server 106 to other computers via the one or more communication interfaces 704 (wired or wireless) and one or more communication networks, such as the Internet, other wide area networks, local area networks, metropolitan area networks, and so on;

an optional user interface module 716 that receives commands from the user via the input devices 708 and generates user interface objects in the display device 706;

a database access module 718 that interfaces with and provides access (e.g., select, update, delete, etc.) to databases in server 106;

front end 108, as described herein;

web database search engine 124 and web database 126, as described herein;

local search engine 130, for processing a local search query 720 received from the client computer system 102, wherein the local search query 720 includes a current position 722 of client computer system 102 and optionally includes metadata indicating a date 724 and a time 726 at which local search query 720 was received at server 106;

directions logs 135 including the directions queries 136, as described herein; and mobile location-based search logs 134, as described herein.

Local search engine processes the local search query 720 to produce a set of places 728 ranked in accordance with scores 730, the places database 123 including the place records 137, and the popularity database 133 including the popularity records 138, as described herein.

Each of the above identified elements may be stored in one or more of the previously mentioned memory devices, and corresponds to a set of instructions for performing a function described above. The set of instructions can be executed by one or more processors (e.g., the CPUs 702). The above identified modules or programs (i.e., sets of instructions) need not be implemented as separate software programs, procedures or modules, and thus various subsets of these modules may be combined or otherwise re-arranged in various embodiments. In some embodiments, memory 710 may store a subset of the modules and data structures identified above. Furthermore, memory 710 may store additional modules and data structures not described above.

Although FIG. 7 shows a "server," FIG. 7 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 7 could be implemented on single servers and single items could be implemented by one or more servers. The actual number of servers used to implement server 106 and how features are allocated among them will vary from one implementation to another, and may depend in part on the amount of data traffic that the system must handle during peak usage periods as well as during average usage periods.

Embodiments for ranking search results of local search queries are described with respect to FIGS. 8-12 below.

Figure 8:
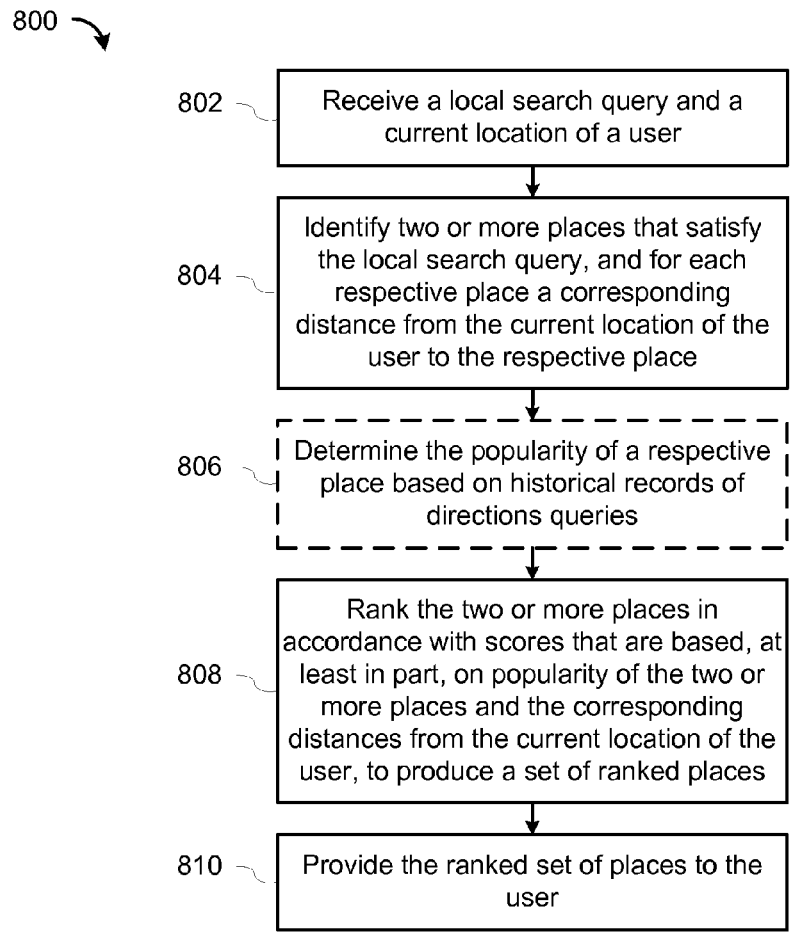
FIG. 8 is a flowchart of a method for ranking search results of local search queries, according to some embodiments.

FIG. 8 is a flowchart of a method 800 for ranking search results of local search queries, according to some embodiments. The local search engine 130 receives (802) a local search query and a current location of a user. In some embodiments, a search query submitted by the user is deemed to be a local search query if the search query includes an address or a partial address. In some embodiments, a search query submitted by the user is deemed to be a local search query if the search query is annotated with a location (e.g., coordinates from a satellite navigation positioning/navigation system). In some embodiments, a search query submitted by the user is deemed to be a local search query if at least a predetermined percentage (e.g., greater than 20%) of the search results correspond to places (e.g., restaurants, points of interest, etc.). In some embodiments, a search query submitted by the user is deemed to be a local search query if the search query is included in a list of predetermined local queries. In some embodiments, a search query submitted by the user (i.e., received from a client 102 of the user) is deemed to be a local search query, even if search query does not contain an address or partial address and is not annotated with a location, when the search query is submitted to the local search engine 130 by a client 102 using a mapping program, or from a mapping web page, or via a mapping application API. In other words, in these embodiments the determination of whether a search query is a local search query is made by the client 102, or the user of the client 102, by determining the application or web page from which the search query is submitted to server 106.

In some other embodiments, a search query submitted by the user (i.e., received from a client 102 of the user) is deemed to be a local search query if the query contains terms matching a predefined whitelist, which contains terms (e.g., "restaurant," and "bookstore") that are associated with local search queries, and the search query does not specify a location (e.g., "New York, N.Y.") that is inconsistent with the current location of the user. Optionally, the user-submitted search query is also compared with a predefined blacklist, and if it contains any term in the predefined blacklist, the query is assumed not to be a local search query. In addition, or alternatively, in some embodiments the user-submitted query is determined to be a local search query if the local search engine produces at least one result having a score that exceeds a predefined threshold. In the latter embodiments, all user-submitted search queries, or all user-submitted search queries not excluded from being a local search query (e.g., by preprocessing, such as comparison with a predefined blacklist), are processed by the local search engine 130. If none of the search results produced by the local search engine have a score (e.g., an information retrieval score) that exceeds the predefined threshold, then the search query is deemed not to be a local search query.

In some embodiments, the current location of the user is obtained from an electronic device of the user using a positioning system selected from the group consisting of a global satellite positioning system, a cellular tower positioning system, a Wi-Fi positioning system, and an Internet Protocol positioning system. In some embodiments, the electronic device is a mobile electronic device.

Next, the local search engine 130 identifies (804) two or more places that satisfy the local search query, and for each respective place it also identifies or determines a corresponding distance from the current location of the user to the respective place. In some embodiments, the local search engine 130 identifies (804) the two or more places that satisfy the local search query by identifying two or more places that satisfy the local search query and that are within a predetermined distance from the current location of the user. In some embodiments, the predetermined distance is selected from the group consisting of a maximum distance that that user is willing to travel and a maximum distance that other users were willing to travel to the two or more places.

In some embodiments, a respective place of the identified places is selected from the group consisting of a business, a landmark, a park, and a point-of-interest.

In some embodiments, the local search engine 130 determines (806) the popularity of a respective place based on historical records of directions queries. In these embodiments, the popularity of a respective place comprises a historical popularity of the respective place in directions queries. In some embodiments, the popularity of a respective place comprises a historical popularity of the respective place in directions queries received during a time frame corresponding to a time at which the search query is received. In some embodiments, the time frame is selected from the group consisting of: a day of the week, a group of days of the week, a time of day, a time of day during a particular day of the week, and a time of day during a particular group of days of the week. In some embodiments, the popularity of a respective place is based on the historical popularity of the respective place in directions queries received during a time frame corresponding to a time at which the search query is received and at least one additional factor selected from the group consisting of: user ratings of the place, user reviews of the place, and a query independent page rank of a web page associated with the place. In some implementations, for each place in the local search results, at least two factors are combined to produce a final score, and then the search results are ordered based on their final scores. In these embodiments the at least two factors include an information retrieval (IR) score, which is produced by the local search engine based on how well each place (i.e., search result) matches the search query, and a popularity score. As described in more detail below, the popularity score for a respective place takes into account popularity of the respective place (e.g., as a destination in directions search queries) during a corresponding time period and for travel distances in a same distance range as the distance from the user's current location to the respective place. In some embodiments, the aforementioned information retrieval score for a respective place is based on how well the place matches the user-submitted search query and is optionally also based on one or more user profile factors, for example a URL, website, category or topic that is favored or disfavored by the user according to the user profile of the user.

Figure 9:
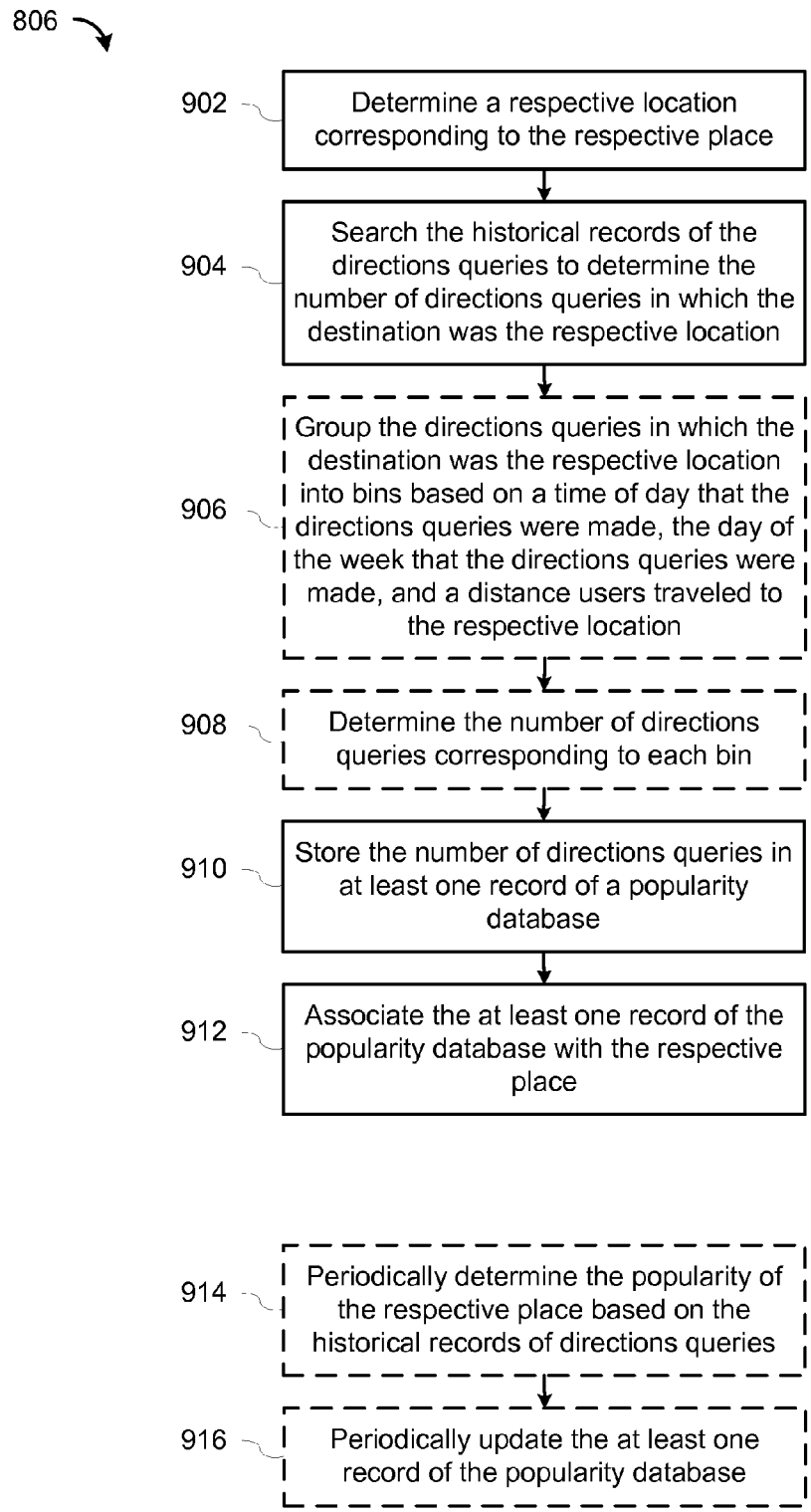
FIG. 9 is a flowchart of a method for determining the popularity of the respective place based on historical records of directions queries, according to some embodiments.

Attention is now directed to FIG. 9, which is a flowchart of a method for determining (806) the popularity of the respective place based on historical records of directions queries (and, optionally, mobile device based local search queries), according to some embodiments. The local search engine 130 determines (902) a respective location corresponding to the respective place. In some embodiments, the respective location is identified by a set of coordinates. In some embodiments, the set of coordinates is selected from the group consisting of latitude and longitude coordinates and global satellite navigation coordinates. Alternatively, the respective location is identified as matching a respective place record 137 (FIG. 3).

Next, the local search engine 130 searches (904) the historical records of the directions queries to determine the number of historical directions queries in which the destination was the respective location (i.e., the search result for which a popularity is being determined). In some embodiments, the historical records of directions queries are supplemented by mobile device based local search queries, and in those embodiments each of the operations of method 806 is performed with respect to both directions queries in which the destination was the respective location and mobile location-based queries in which the user-selected search result was the respective location.

In some embodiments, the local search engine 130 groups (906) the directions queries in which the destination was the respective location into bins based on a time of day (or a time period) that the directions queries were made, the day of the week (or days of the week) that the directions queries were made, and a travel distance (or a range of distances) from the starting point to the ending point in those historical queries (i.e., the distance users traveled, or would have traveled, to the respective location). The local search engine 130 then determines (908) the number of directions queries corresponding to each bin.

Next, the local search engine 130 stores (910) the number of directions queries in at least one record of a popularity database. In some embodiments, the local search engine 130 stores (910) the number of directions queries in at least one record of the popularity database by storing the number of directions queries for each bin in respective records of the popularity database. Typically, operations 906, 908, and 910 are performed long before the current local search query is received by the local search engine, thereby populating the popularity database 133 with popularity records 138, as described above. Alternatively, these operations (906, 908, 910) are performed in real time, in response to a local search query.

The local search engine 130 then associates (912) at least one record of the popularity database with the respective place (i.e., one of the search results produced by the local search engine). Stated another way, or alternatively, the local search 130 searches the popularity database 133 for popularity records 138 matching each respective place in the search results, and identifies the matching popularity records 138. When appropriate, the identified popularity records 138 for a respective place are filtered to remove, or to reduce the influence of, popularity records for time periods and travel distances that do not match the current time and the travel distance from the user to the respective place.

In some embodiments, the local search engine 130 periodically determines (914) the popularity of the respective place based on the historical records of directions queries and periodically updates (916) one or more records of the popularity database. In other words, the local search engine 130 periodically performs at least operations 906 to 910.

Returning to FIG. 8, the local search engine 130 ranks (808) the two or more places (i.e., the search results produced by the local search engine) in accordance with scores (e.g., the scores 730) that are based, at least in part, on popularity of the two or more places and the corresponding distances from the current location of the user, to produce a set of ranked places. Breaking this down, the local search engine produces a popularity score for each search result (i.e., respective location), optionally produces a final score that is computed for each search result based at least in part on the popularity score (as explained above), and then ranks the search results in accordance with those scores.

Figure 10:
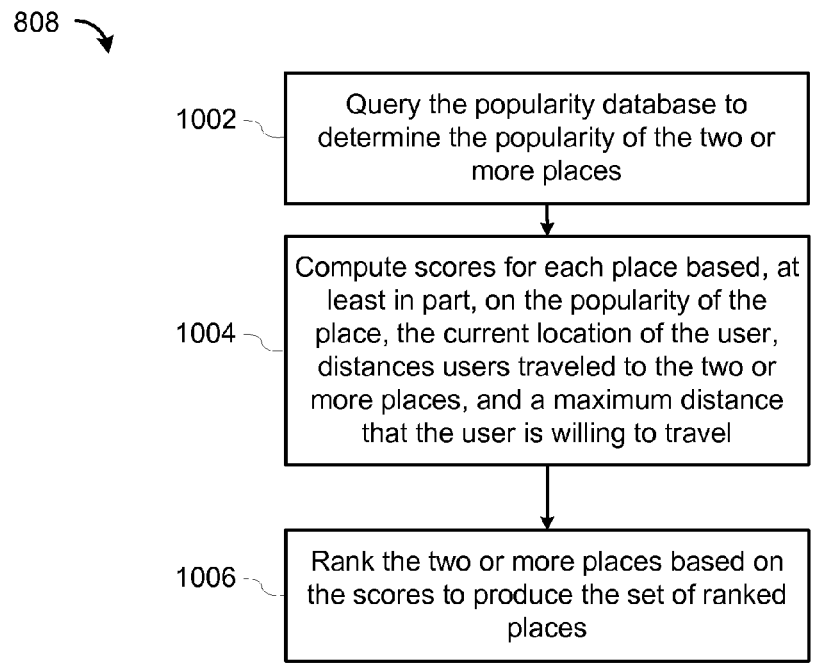
FIG. 10 is a flowchart of a method for ranking the places in accordance with scores, according to some embodiments.
Figure 11:
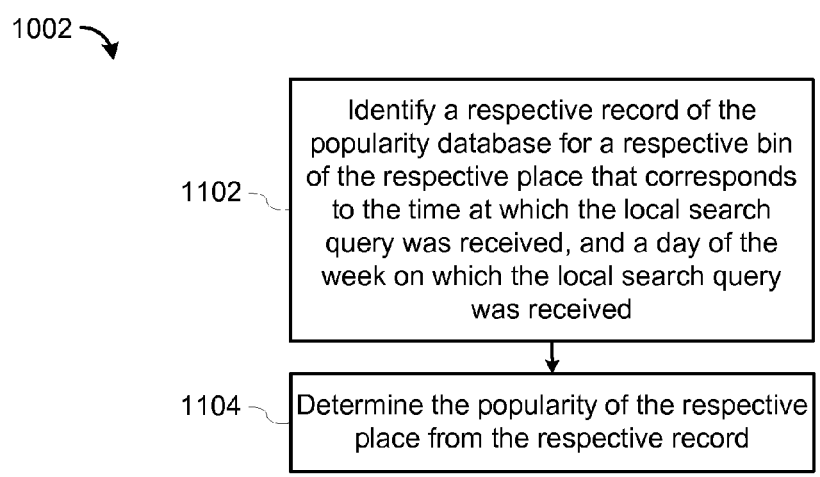
FIG. 11 is a flowchart of a method for querying a popularity database to determine the popularity of a respective place, according to some embodiments.

Attention is now directed to FIG. 10, which is a flowchart of a method for ranking (808) the two or more places in accordance with scores that are based, at least in part, on the popularity of the two or more places and the current location of the user, to produce the set of ranked places, according to some embodiments. The local search engine 130 queries (1002) the popularity database to determine the popularity of the two or more places. Attention is now directed to FIG. 11, which is a flowchart of a method for querying (1002) a popularity database to determine the popularity of a respective place, according to some embodiments. The local search engine 130 identifies (1102) a respective record of the popularity database for a respective bin of the respective place that corresponds to the time (or time period) at which the local search query was received, and a day of the week (or days of the week) on which the local search query was received. For example, if the local search query was received at 9 AM on Monday, the local search engine 130 identifies a record in the popularity database for the respective place that corresponds to a bin including the time of 9 AM and the day of week of Monday.

The local search engine 130 then determines (1104) the popularity of the respective place from the respective record. For example, the local search engine 130 uses the number of "votes" (e.g., the value of the count field in FIG. 4) as a measure of the popularity. Alternatively, the local search engine 130 uses the number of "votes" as one factor in a popularity scoring function.

Optionally, when generating a popularity score (1102, 1104) for a particular search result, the local search engine takes into account more than one popularity record (i.e., for more than one bin) when predefined criteria are satisfied. For example, if the count in one popularity record, for the bin that best matches the search result, is below a threshold value (e.g., 5 or 10), the local search engine generates a combination of the counts in other bins (i.e., for other time periods and/or other travel distance ranges) for the same respective location. Optionally, this combination is a weighted combination, in which the count for each bin is weighted by a factor corresponding to how similar the bin is to the bin that best matches the current time and the travel distance from the user's current location to the respective location.

Returning to FIG. 10, the local search engine 130 computes (1004) scores for each place (i.e., each search result) based, at least in part, on the popularity of the place, the current location of the user, distances users traveled to the two or more places, and a maximum distance that the user is willing to travel. In some embodiments, the scores are also computed based on factors selected from the group consisting of reviews of the two or more places, search engine rankings for web pages associated with the two or more places, and a mode of travel. In some embodiments, the popularity score for each respective place is independent of any characteristics of the user who submitted the local search query other than the user's current location and, optionally, a maximum distance the user is willing to travel. As discussed above, an information retrieval score or other score that is combined with the popularity score may optionally include one or more factors that are personalized with respect to the user who submitted the local search query.

The local search engine 130 then ranks (1006) the two or more places based on the scores to produce the set of ranked places.

Figure 12:
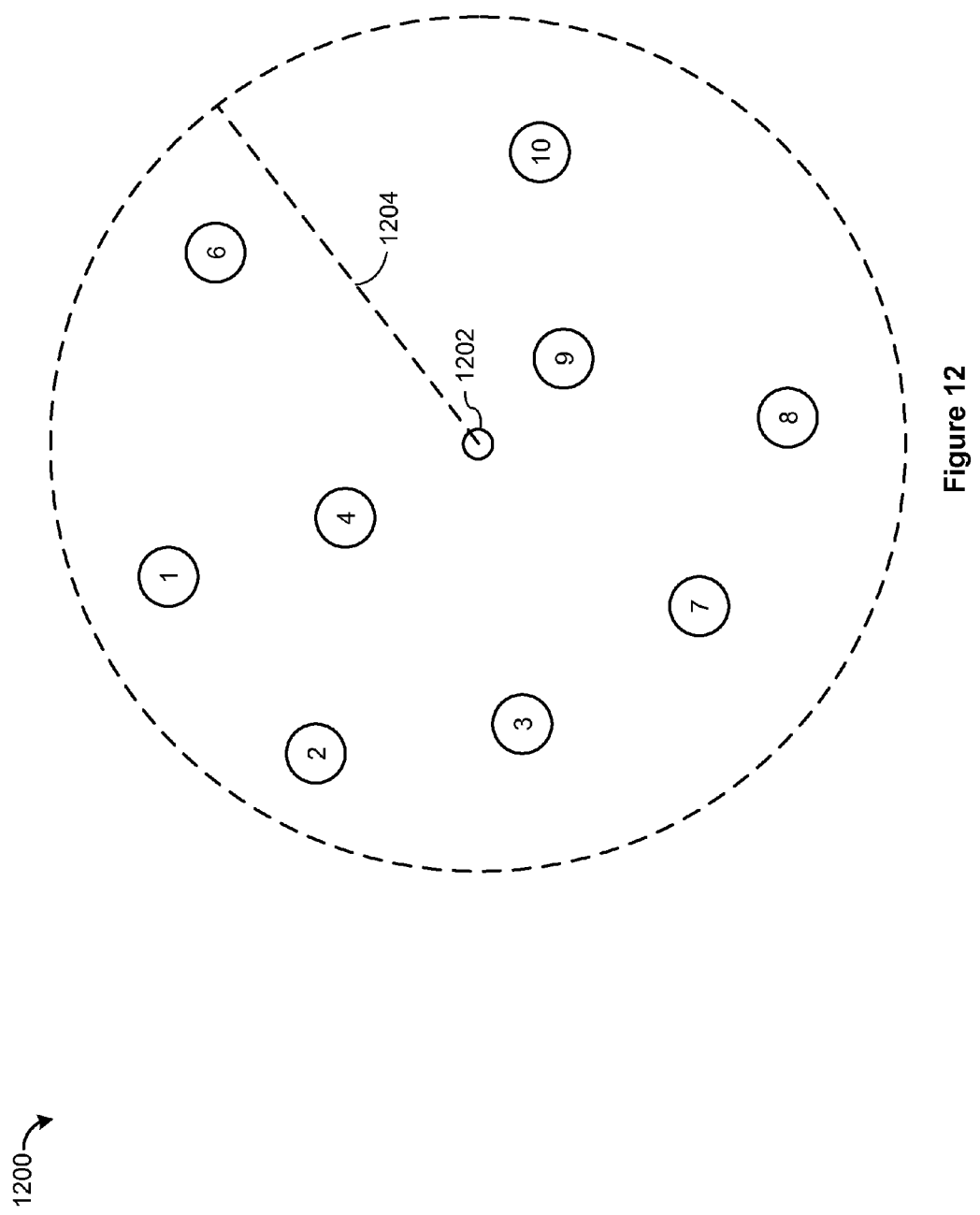
FIG. 12 is a block diagram illustrating a ranked set of places that are within a predetermined radius of a current location of a user, according to some embodiments.

Returning to FIG. 8, the local search engine 130 then provides (810) the ranked set of places to the user. In some embodiments, the local search engine 130 presents, to a user, a subset of the ranked set of places at their corresponding locations on a map (e.g., a street map, or a map showing both roads and geographic features). These embodiments are illustrated in FIG. 12, which is a block diagram 1200 illustrating a ranked set of places 1 to 10 that are within a predetermined radius 1204 of a current location 1202 of a user, according to some embodiments. In some embodiments, the ranked set of places only includes places that satisfy the location query and that is within the radius 1204. In some embodiments, the radius 1204 is the maximum distance that the user who submitted the location search query is willing to travel to reach a place in the ranked set of places. In some embodiments, the radius 1204 is obtained from a user profile (e.g., a search preference stored in the user profile, etc.) of the user who submitted the location search query. In some embodiments, the radius 1204 is included in the location search query as an explicit parameter (e.g., specified by the user). In some embodiments, the radius 1204 is inferred based on the search terms included in the location search query. In some embodiments, the radius 1204 is set to one of a number of predefined default values, each corresponding to a mode of travel (e.g., by foot, car, bus, subway, trolley, etc.). In some embodiments, the radius 1204 is the maximum distance that other users who submitted location search queries having similar search terms were willing to travel to reach a place in the ranked set of places, as indicated by their requesting travel directions to specific location in the ranked set of places. Alternatively, the radius 1204 is the maximum distance that other users who submitted location search queries having similar search terms were willing to travel to reach a place in the ranked set of places, after excluding travel distances that meeting predefined outlier criteria (e.g., distances more than N standard deviations above a mean travel distance, where N is value between 1 and 3, inclusive).

The methods 800, 806, 808, and 1002 may be governed by instructions that are stored in a computer readable storage medium and that are executed by one or more processors of one or more servers. Each of the operations shown in FIGS. 8-11 may correspond to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted and/or executable by one or more processors.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for ranking search results of local search queries, comprising:
   at a server including one or more processors and memory storing one or more programs, the one or more processors executing the one or more programs to perform the operations of:
      receiving a search query and a current location of a user;
      identifying two or more places that satisfy the search query, and for each respective place determining a corresponding distance from the current location of the user to the respective place and a count of the number of historical queries for directions to the respective place, the respective place having a respective location;
      ranking the two or more places in accordance with scores for each place, wherein the score for a respective place is based on the count of the number of historical directions queries for directions to the respective place, distances between the respective location of the respective place and origins in historical queries for directions to the respective location of the respective place, and the distance from the current location of the user to the respective place, to produce a set of ranked places; and
      providing the ranked set of places to the user.

2. The method of claim 1, wherein the count of the number of historical directions queries for directions to each respective place is measured during an historical time frame corresponding to a time at which the search query is received.

3. The method of claim 1, wherein the score for each respective place is further based on at least one additional factor selected from the group consisting of: user ratings of the respective place, user reviews of the respective place, and a query independent page rank of a web page associated with the respective place.

4. The method of claim 1, wherein prior to ranking the two or more places in accordance with scores for each respective place to produce the set of ranked places, the method includes determining, based on historical records of directions queries to each respective place, the count of the number of historical directions queries for directions to a respective location corresponding to the respective place.

5. The method of claim 1, wherein determining the count of the number of historical directions queries for directions to a respective location corresponding to the respective place includes:
   determining a respective location corresponding to the respective place;
   searching the historical records of the directions queries to determine a number of directions queries in which the destination was the respective location;
   storing the number of directions queries in which the destination was the respective location in at least one record of a popularity database; and
   associating the at least one record of the popularity database with the respective place.

6. The method of claim 5, wherein the respective location is a set of coordinates.

7. The method of claim 6, wherein the set of coordinates is selected from the group consisting of:
   latitude and longitude coordinates; and
   global satellite navigation coordinates.

8. The method of claim 5, wherein prior to storing the number of directions queries in at least one record of the popularity database, the method includes:
   grouping the directions queries in which the destination was the respective location into bins based on times of day that the directions queries were made, days of the week that the directions queries were made, and distances between origins in the directions queries and the respective location; and
   determining a respective number of directions queries corresponding to each bin.

9. The method of claim 8, wherein storing the number of directions queries in at least one record of the popularity database includes storing the respective number of directions queries for each bin in the at least one record of the popularity database associated with the respective place.

10. The method of claim 8, wherein the score for each respective place is based on a count of directions queries that corresponds to the time at which the search query was received, and a day of the week on which the search query was received.

11. The method of claim 1, wherein the score for each respective place is further based on factors selected from the group consisting of:
    reviews of the respective places;
    search engine rankings for web pages associated with the respective place; and
    a mode of travel.

12. The method of claim 5, including:
    periodically updating the at least one record of the popularity database associated with the respective place to reflect a current count of the number of directions queries in which the destination was the respective location.

13. The method of claim 1, wherein the score for each respective place is based, at least in part, on a count obtained from historical records of search queries received from mobile devices in which a user-selected search result was the respective place.

14. The method of claim 1, wherein identifying the two or more places that satisfy the search query includes identifying two or more places that are within a predetermined distance from the current location of the user.

15. The method of claim 14, wherein the predetermined distance is selected from the group consisting of:
    a maximum distance that user is willing to travel; and
    a maximum distance between the origins of historical queries for directions to each respective place and the location of each respective place.

16. The method of claim 1, wherein a respective place of the two or more places is a member of the group consisting of:
    a business;
    a landmark;
    a park; and
    a point-of-interest.

17. The method of claim 1, wherein the current location of the user is obtained from a mobile electronic device of the user using a positioning system selected from the group consisting of:
    a global satellite positioning system;
    a cellular tower positioning system;
    a Wi-Fi positioning system; and
    an Internet Protocol positioning system.

18. A system for ranking location search results of search queries, comprising:
    one or more processors;
    memory; and
    one or more programs stored in the memory, the one or more programs comprising instructions to:
      receive a search query and a current location of a user;
      identify two or more places that satisfy the search query, and for each respective place determining a corresponding distance from the current location of the user to the respective place and a count of the number of historical queries for directions to the respective place, the respective place having a respective location;
      rank the two or more places in accordance with scores for each place, wherein the score for a respective place is based on the count of the number of historical directions queries for directions to the respective place, distances between the respective location of the respective place and origins in historical queries for directions to the respective location of the respective place, and the distance from the current location of the user to the respective place, to produce a set of ranked places; and
      provide the ranked set of places to the user.

19. The system of claim 18, wherein the count of the number of historical directions queries to each respective place is measured during an historical time frame corresponding to a time at which the search query is received.

20. The system of claim 18, wherein the score for each respective place is further based on at least one additional factor selected from the group consisting of:
- user ratings of the respective place;
- user reviews of the respective place; and
- a query independent page rank of a web page associated with the respective place.

21. The system of claim 18, further comprising instructions to execute prior to ranking the two or more places in accordance with scores to produce the set of ranked places, including instructions to determine, based on historical records of directions queries to each respective place, the count of the number of historical directions queries for directions to a respective location corresponding to the respective place.

22. The system of claim 21, wherein the instructions to determine the count of the number of historical directions queries for directions to a respective location corresponding to the respective place include instructions to:
- determine a respective location corresponding to the respective place;
- search the historical records of the directions queries to determine a number of directions queries in which the destination was the respective location;
- store the number of directions queries in which the destination was the respective location in at least one record of a popularity database; and
- associate the at least one record of the popularity database with the respective place.

23. The system of claim 18, wherein the score for each respective place is based, at least in part, on a count obtained from historical records of search queries received from mobile devices in which a user-selected search result was the respective place.

24. The system of claim 18, wherein the instructions to identify two or more places that satisfy the search query includes instructions to identify two or more places that are within a predetermined distance from the current location of the user.

25. A computer readable storage medium storing one or more programs configured for execution by a computer, the one or more programs comprising instructions to:
- receive a search query and a current location of a user;
- identify two or more places that satisfy the search query, and for each respective place determine a corresponding distance from the current location of the user to the respective place and a count of the number of historical queries for directions to the respective place, the respective place having a respective location;
- rank the two or more places in accordance with scores for each place, wherein the score for a respective place is based on the count of the number of historical directions queries to the respective place, distances between the respective location of the respective place and origins in historical queries for directions to the respective location of the respective place, and the distance from the current location of the user to the respective place, to produce a set of ranked places; and
- provide the ranked set of places to the user.

26. The computer readable storage medium of claim 25, wherein the count of the number of historical directions queries to each respective place is measured during an historical time frame corresponding to a time at which the search query is received.

27. The computer readable storage medium of claim 25, wherein the score for each respective place is further based on at least one additional factor selected from the group consisting of:
- user ratings of the respective place;
- user reviews of the respective place;
- and a query independent page rank of a web page associated with the respective place.

28. The computer readable storage medium of claim 25, further comprising instructions to execute prior to ranking the two or more places in accordance with scores to produce the set of ranked places, including instructions to determine, based on historical records of directions queries to each respective place, the count of the number of historical directions queries for directions to a respective location corresponding to the respective place.

29. The computer readable storage medium of claim 28, wherein the instructions to determine the count of the number of historical directions queries for directions to a respective location corresponding to the respective place include instructions to:
- determine a respective location corresponding to the respective place;
- search the historical records of the directions queries to determine a number of directions queries in which the destination was the respective location;
- store the number of directions queries in which the destination was the respective location in at least one record of a popularity database; and
- associate the at least one record of the popularity database with the respective place.

30. The computer readable storage medium of claim 25, wherein the score for each respective place is based, at least in part, on a count obtained from historical records of search queries received from mobile devices in which a user-selected search result was the respective place.

31. The computer readable storage medium of claim 25, wherein the instructions to identify two or more places that satisfy the search query includes instructions to identify two or more places that are within a predetermined distance from the current location of the user.

* * * * *